April 14, 1959     C. F. HENDEE ET AL     2,882,418
ANALYSIS OF UNKNOWN SUBSTANCES
Filed Aug. 2, 1954

INVENTORS
CHARLES F. HENDEE
SAMUEL FINE

BY

AGENT

United States Patent Office 2,882,418
Patented Apr. 14, 1959

2,882,418

ANALYSIS OF UNKNOWN SUBSTANCES

Charles F. Hendee, Irvington-on-Hudson, and Samuel Fine, New York, N.Y., assignors to North American Philips Co., Inc., New York, N.Y.

Application August 2, 1954, Serial No. 447,054

10 Claims. (Cl. 250—83.6)

This invention relates to a method and apparatus for identifying chemical elements, either alone or in combination, utilizing X-ray-responsive proportional counters.

U.S. application, Serial No. 432,793, filed May 27, 1954, describes a technique for identifying elements which may be characterized as X-ray fluorescent spectrometry. This involves irradiating an unknown specimen containing the elements to be identified with X-radiation of sufficient energy content to excite the constituents of the specimen to produce their characteristic fluorescent radiation. The fluorescent radiation emanating from the specimen is then directly detected by a proportional counter, and the signal pulses at the output of the counter utilized to identify the composition of the specimen.

The apparatus and method described in that application exhibit certain limitations which restrict its applications in the X-ray and chemical fields. One such limitation is that, with that apparatus, it is difficult to accurately resolve the characteristic fluorescent radiation of elements of adjacent atomic number, such as the rare earth metals.

The present invention is an improvement of the method and apparatus described in the aforementioned application, and is based on the realization that the escape pulses of a proportional counter are lower in amplitude than that of the corresponding main pulses, and that the absolute fluctuation of the magnitude of the escape pulses around some mean value is less than that of the main pulse. Stated otherwise, the half-width of the resultant pulse height distribution of the escape pulse is less than the half width of the pulse height distribution of the main pulse. The invention is also based on the fact that certain gas fillings for proportional counters enable the production of a greater percentage of escape pulses than main pulses, so that the former may be utilized to identify elements in an apparatus similar to that described in the aforementioned application.

The method of the invention, therefore, comprises irradiating a specimen with X-radiation of sufficient energy content to excite the constituents of the specimen to radiate their fluorescent characteristic spectrum. This fluorescent radiation is directly detected by a proportional counter containing a gas filling of a constituent having an atomic number below the atomic numbers of the elements of the specimen to be identified or measured. Coupled to the proportional counter is a device for measuring the magnitude of only the escape pulses derived from the proportional counter, and for indicating their intensity. Information derived from the escape pulses produced by the fluorescent radiation of closely-lying elements affords extremely convenient and accurate means for identifying the constituents and determining the relative proportions thereof in the specimen producing that radiation.

The distinction between the main and escape pulses of a proportional counter will now be explained in greater detail; however, we wish it to be understood that the following explanation is not intended to be a rigorous treatment of the subject, but will merely provide some general concepts with which the invention will be better appreciated.

The main pulse of a proportional counter results when all of the energy of the incident radiation is utilized in the production of ion-pairs which are thereafter subjected to gas amplification as a result of the intense electrostatic field between the anode wire and cathode. Therefore, in a proportional counter, the main electrical pulse exhibits a magnitude or amplitude proportional to the energy content of the incident radiation.

The escape pulse, on the other hand, possesses an amplitude proportional to the energy content of the incident radiation minus the energy of a fluorescent photon which is characteristic of the absorbing medium. This may be explained in the following manner. When an atom of the gas filling absorbs incident radiation of the proper energy, it produces a photo-electron from one of its inner shells. This vacancy in the inner shell is filled by a process of reorganization which involves electrons from the outer shells of the atom transferring to the vacancy in the inner shells. This transfer will result in the production of a fluorescent photon. If the fluorescent photon escapes from the atom and is either absorbed by the wall of the counter or passes completely out of the counter, then the escape pulse results. If, on the other hand, this photon is absorbed by the atom producing the fluorescent photon or other atoms of the gas filling, the main pulse, mentioned above, is produced. It will be evident from the foregoing that the escape pulse, energy-wise, will always be lower in magnitude than the main pulse by the magnitude of the energy of the escaped fluorescent photon.

The present invention is based on the realization that, due to their lower energy, resulting in a smaller half-width of the pulse height distribution, the escape pulses afford much more accurate means for identifying the fluorescent radiation from proximate elements of the periodic table.

The invention will now be described in connection with the accompanying drawing, wherein.

Figure 1:
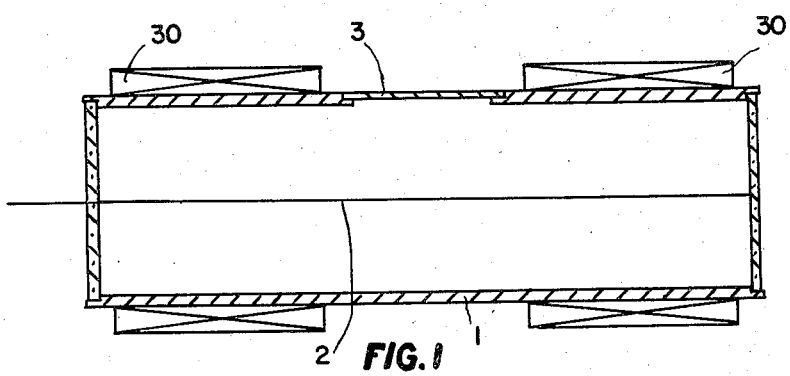
Fig. 1 is a cross-sectional view of a proportional counter.

Referring now to the drawing, Fig. 1 shows a cross-section of a typical proportional counter. It generally comprises a cylindrical metal cathode 1 surrounding a central anode wire 2. A side window 3 is provided in the cathode 1 to enable radiation to enter the counter without being unduly absorbed. For proper operation, the counter is supplied with a suitable potential such that its operating point lies in the proportional region of its discharge characteristic. For a more detailed description of such a tube, reference is had to a copending U.S. application, Serial No. 404,524, filed January 18, 1954, now U.S. Patent 2,837,677.

Figure 2:
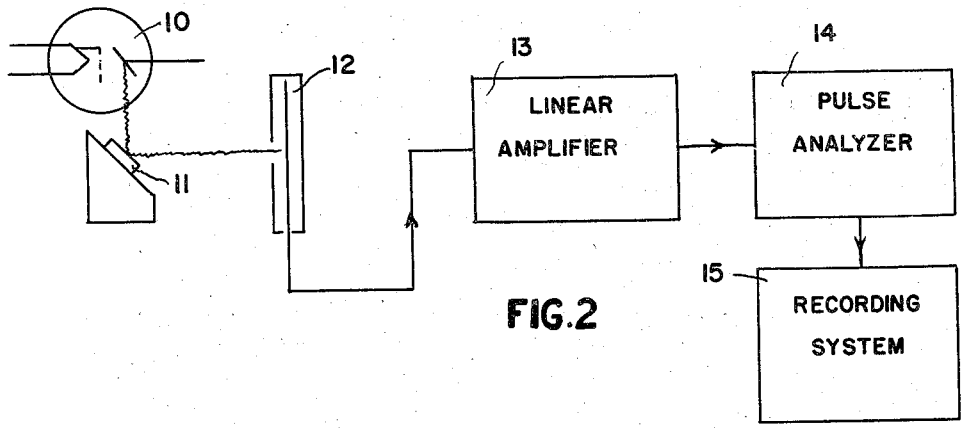
Fig. 2 is a schematic view of a spectrometric apparatus of the invention.

Fig. 2 shows schematically an analyzing apparatus of the invention. It comprises a source of radiation 10, such as an X-ray tube, positioned to irradiate a specimen 11. The voltage applied to the X-ray tube 10 is chosen to exceed that necessary to excite fluorescent radiation from the specimen constituents. For a specimen consisting of praesodymium and neodymium, a voltage of 50 kv. suffices to excite the K emission lines. The characteristic fluorescent radiation of the specimen is directly detected by a proportional counter 12, such as that illustrated in Fig. 1. The pulses at the output of the counter 12 are amplified in a linear amplifier 13.

Because of the statistical nature of the charge production and gas multiplication processes within the counter, the output pulses therefrom do not appear with amplitudes precisely proportional to the energy content of the fluorescent radiation, but with an amplitude distribution centering around that value. The net effect for radiation from adjacent elements of the periodic table is to produce a graph in which the peaks overlap to a considerable extent, with the consequence that their absolute values are not readily determinable.

In accordance with the invention, an apparatus is employed to improve the resolution of the adjacent elements, whereby an analysis of the data yields results of higher accuracy. This is accomplished by employing, as the detector, a proportional counter having a gas filling whose atomic number is slightly below, i.e., less than that of the constituents of the specimen to be determined. For the rare earth elements praesodymium and neodymium, a xenon gas-filling is employed. Further, the detector is coupled to a device 14 for driving only the escape peak information from the pulses produced thereby, for example, a pulse analyzer. The output of the analyzer is in turn coupled to a counting and recording system 15, such as a strip chart recorder.

As described in our co-pending application, Serial No. 432,793, the pulses at the output of the proportional counter 12 will have a magnitude proportional to the energy content of the fluorescent radiation and a counting rate dependent upon the intensity of that radiation. As explained in this application, however, each characteristic radiation from the specimen that is absorbed in the counter will produce one of two pulses of different magnitude at the output of the counter, either a main pulse or an escape pulse. The counting rates of these two types of pulses will differ depending on the fluorescence yield of the absorbing medium of the counter. The fluorescence yield increases with atomic number and has values of 20, 50, and 80% for the rare gases, argon, krypton and xenon, respectively. Hence, when utilizing the counting rate to determine the quantities of the elements in the specimen, one compares the counts per second of the escape peaks of the elements to one another.

Figure 3:
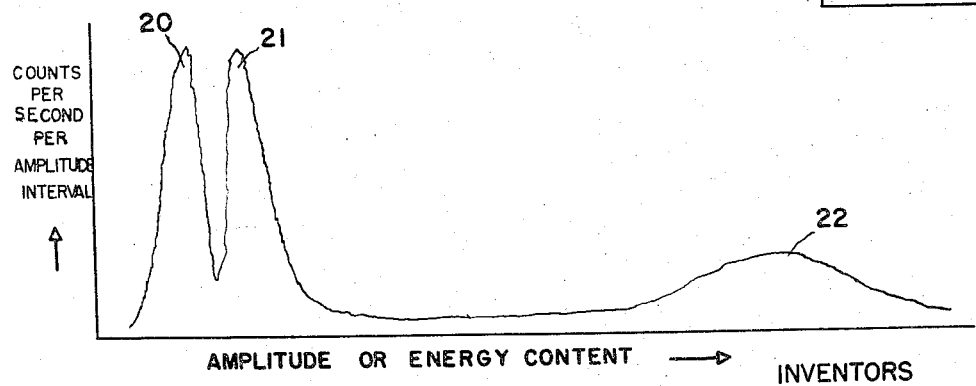
Fig. 3 is a graph showing the resolution of rare earth main peaks and escape peaks.

When a specimen containing praesodymium and neodymium is irradiated, each of these elements will produce characteristic emissions. The detection of these two emissions by a xenon-filled proportional counter will result in the production of pulses of four different magnitudes at the output thereof consisting of a pair of main and a pair of escape pulses. Xenon has a fluorescence yield of about 80%, which denotes that about 80% of the pulses of a xenon-filled proportional counter will have the magnitude of the escape peak. Consequently, if one were to count the number of pulses per second per amplitude interval utilizing a single or multi-channel pulse height analyzer, and record the results in a strip-chart recorder, one would obtain the graph depicted in Fig. 3 for a specimen containing praesodymium and neodymium in about equal proportions. The abscissa of the graph of Fig. 3 represents amplitude or energy content, and the ordinate represents counts per second per amplitude interval. The peak 20 furthest to the left represents the xenon escape peak of the praesodymium radiation, and the adjacent peak 21 the xenon escape peak of the neodymium radiation. The peak 22 on the far right represents the unresolved main peaks of the two rare earth elements. In order to determine the relative proportions of these elements in the specimen, one proceeds in the same manner as that disclosed in our copending application Serial No. 432,793; for example, measuring the total number of counts per second for each of the escape peaks 20 and 21, i.e., the area under each curve, dividing the two results to obtain a ratio, and comparing the ratio thus obtained to ratios obtained with a plurality of different standards employing known amounts of the two elements to determine the proportions. The accuracy of such a technique depends upon the exactness with which the peaks representing the different emissions have been resolved. As is evident from the figure, not only is the counting rate of the escape peaks materially greater than that of the main peak, due to utilization of a gas filling of relatively high atomic number, but the resolution of the escape peaks is greatly superior to that of the main peaks. As a matter of fact, the main peaks are not resolved at all. Hence, the advantages of utilizing a gas-filling whose atomic number is just below that of the specimen constituents producing the fluorescent radiation, and of measuring only the information present in the escape peaks produced by the proportional counter are to maintain the energy content of the thus-utilized information at its lowest possible value in order to insure the maximum possible resolution of the peaks.

In choosing a suitable gas filling for the proportional counter, the following rules should be followed. The atomic number of the filling should not be so high that the characteristic radiation from the specimen is not absorbed and escape peaks not produced. In other words, the generally preferred filling will have an atomic number such that increasing that number by one will not result in the production of escape peaks at the desired minimal energy positions. That is to say, a filling is chosen having an absorption edge closest to but below, energy-wise, the characteristic radiation of the lowest atomic-numbered element of the specimen. In general, this condition can be satisfied by selecting elements of one to five atomic numbers below the lowest atomic-numbered element to be analyzed. The atomic number, however, of the filling should preferably differ by not more than about ten from that of the specimen constituents to be analyzed, though the advantages of the invention will still be realized—of course, to a smaller extent—when the difference exceeds that amount. The gas-fillings most often employed will be the rare gases, since they function quite well as radiation-absorbing materials for a proportional counter. Thus, krypton would be suitable for resolving the escape peaks of the elements rubidium, strontium, yttrium and zirconium. Likewise, xenon would be suitable for cesium, barium, lanthanum, and the rare earth metals. In general, the gas-filling will consist of the rare gas and a small amount of a quench gas, such as an organic quench, at total pressures ranging from about 50 mm. of Hg to atmospheric. However, even mixtures of gases other than quench gases may be advantageously employed, provided that the desired gas, namely, the gas having the proper atomic number, plays a dominant role in the formation of the desired escape pulses.

In accordance with a further aspect of the invention, in order to obtain a gas-filling having a component whose atomic number fulfills the foregoing requirements of having a value just below that of the specimen constituents and in accordance with the foregoing rules, a metal, metal-organic or other volatile metal compound gas-filling may be employed in the proportional counter in order to extend the available X-ray absorbing materials and thereby extend the number of groups of adjacent elements whose characteristic radiations may be resolved and analyzed by means of the escape peaks. In such event, the metal component provides the absorbing medium complying with the foregoing requirements.

Many of the higher numbered metals of the periodic table are available as, for example, metal-organic compounds whose vapor pressure at room temperature is sufficient to make them usable as counter fillings. For example, a counter filling of trimethylrhenium which has a boiling point of 60° C., would resolve the escape peaks of radiations from osmium, iridium, platinum and gold.

However, certain metals or metal compounds would have boiling points at which their vapor pressure at room temperature would not render them suitable as a gas filling for a proportional counter. This limitation, however, may be obviated in accordance with a further aspect of the invention by providing heating means surrounding the counter for maintaining the filling at an elevated temperature suitable for obtaining a vapor pressure of the metal component which would render the filling operable as an X-radiation absorbing medium and proportional counter fill.

Examples of the foregoing are mercury which, when maintained at a temperature of 250° C. by external heating, exhibits a vapor pressure of 75 mm. (Hg), which is sufficiently high for good X-ray absorption and counter operation. A proportional counter filled with mercury vapor would be useful for the resolution and analysis of the escape peaks of radiations from thalium, lead, bismuth and polonium.

As another illustrative example, diethylzinc, whose boiling point is 118° C., in a counter operated at a moderately elevated temperature, such as 50° C., would resolve the escape peaks of radiations from gallium, germanium, arsenic and selenium.

Fig. 1 of the drawing illustrates the construction of such a counter. The heating means 30 are shown as a pair of heating coils surrounding the counter on opposite sides of the window.

Though the invention has been described in connection with its most important application of determining the proportions of known elements in a specimen, it will be readily understood that it may also be employed to identify unknown elements in a specimen in the same manner as that disclosed in our copending application, Serial No. 432,793. In this case, however, the escape peaks will be utilized for the analysis. The main peaks can be identified by comparing their position along the abscissa to the main peak of a known element provided either as an internal or external standard. The escape peak, as mentioned previously, differs in energy content from the associated main peak by the energy of the escaped photon. Hence, by calibrating the abscissa of the graph of Fig. 3 in terms of energy content in kev., the escape peaks will be readily identified by subtracting the energy of the characteristic escaped photon from the energy of the main peak. For example, the energy of the principle K emission of the element praesodymium is about 36 kev. Since the energy of a xenon photon is about 29.7 kev. the energy of the praesodymium escape peak will be about 6.3 kev. Conversely, if the energies of the main and/or escape peaks are found, the element may be identified. Once again, however, since the escape peaks exhibit higher resolution, they may be profitably employed to determine the energy of the detected fluorescent radiation, and thus identify the element producing the radiation.

While we have described our invention in connection with specific embodiments and applications, other modifications thereof will be readily apparent to those skilled in this art without departing from the spirit and scope of the invention as defined in the appended claims.

What we claim is:

1. A method for analyzing a material for constituent elements thereof, comprising the steps of exposing a specimen of said material to radiation of sufficient intensity to excite the fluorescent X-ray spectrum of at least one of said elements, producing from said fluorescent X-radiation main and escape electrical pulses having amplitudes proportional to the characteristic wave-lengths in said spectrum, and comparing said escape pulses with escape pulses obtained in like manner from a material of known composition, thereby to obtain an indication of the composition of the unknown specimen.

2. A method for analyzing a material for constituent elements thereof, comprising the steps of exposing a specimen of said material to radiation of sufficient intensity to excite the fluorescent X-ray spectrum of at least one of said elements, producing from said fluorescent X-radiation main and escape electrical pulses having amplitudes proportional to the characteristic wave-lengths in said spectrum, counting the number of escape pulses per amplitude interval to determine the peak amplitude of said escape pulses, and comparing said peak amplitude with the peak amplitude obtained in like manner from a material of known compositions, thereby to obtain an indication of the composition of the unknown specimen.

3. A method of analyzing a material for constituent elements thereof, comprising the steps of exposing a specimen of said material to radiation of sufficient intensity to excite the fluorescent X-ray spectrum of at least one of said elements, producing from said fluorescent X-radiation main and escape electrical pulses having amplitudes proportional to the characteristic wave-lengths in said spectrum, counting the number of escape pulses per amplitude interval to determine the peak amplitude of said escape pulses, and comparing the amplitude of said peak with the amplitude of a like peak obtained in like manner from a material of known composition, thereby to obtain an indication of the composition of the unknown specimen.

4. A method of analyzing a material for constituent elements thereof, comprising the steps of exposing a specimen of said material to radiation of sufficient intensity to excite the fluorescent X-ray spectrum of at least one of said elements, producing from said fluorescent X-radiation main and escape electrical pulses having amplitudes proportional to the characteristic wave-lengths in said spectrum, counting the number of escape pulses per amplitude interval to determine the peak amplitude of said escape pulses, and comparing the total number of escape pulses in an amplitude interval having said peak substantially at the center thereof with the number of escape pulses in a like interval obtained in like manner from a material of known composition, thereby to obtain an indication of the composition of the known specimen.

5. A method of analyzing a material for constituent elements thereof, comprising the steps of exposing a specimen of said material to radiation of sufficient intensity to excite the fluorescent X-ray spectrum of at least one of said elements, producing from said fluorescent X-radiation main and escape electrical pulses having amplitudes proportional to the characteristic wave-length in said spectrum, separating the main and escape pulses, counting the number of escape pulses per amplitude interval to determine the peak amplitude of said escape pulses, and comparing said peak amplitude with the peak amplitude obtained in like manner from a material of known composition, thereby to obtain an indication of the composition of the unknown specimen.

6. Apparatus for the analysis of material for the constituent elements thereof, comprising a source of radiation of sufficient energy content to excite the fluorescent X-ray spectrum of at least one of said elements, positioning means for locating a sample of said material with respect to the source for fluorescence, means to produce main and escape electrical pulses having amplitudes proportional to the characteristic wave-lengths of said element in said fluorescent X-ray spectrum, means to separate the main and escape electrical pulses, and means to measure the escape pulses for determining the presence of said elements.

7. Apparatus for the analysis of materials for the constituent elements thereof comprising a source of radiation of sufficient energy content to excite the fluorescent X-ray spectrum of at least one of said elements, positioning means for locating a sample of said material with respect to the source for fluorescence, proportional counting means to produce main and escape electrical pulses having amplitudes proportional to the characteristic wave-lengths of said element in said fluorescent X-ray spectrum, means to separate the main and escape electrical pulses, and means to count the number of escape pulses in a given amplitude interval to determine the peak amplitude in said interval.

8. Apparatus for the analysis of materials for the constituent elements thereof comprising a source of radiation of sufficient energy content to excite the fluorescent X-ray spectrum of at least one of said elements, positioning means for locating a sample of said material with respect to the source for fluorescence, a proportional counter having a gas-filling, including a component having an atomic number between 1 and 10 less than that of said element for producing main and escape electrical pulses having amplitudes proportional to the characteristic wave-lengths of said element in said fluorescent X-ray spectrum, means to separate the main and escape electrical pulses, means to count the number of escape pulses in a given amplitude interval, and means to record the number of pulses in said interval coupled to said counting means for determining the peak amplitude in said interval.

9. Apparatus as claimed in claim 8 in which the gas-filling of the proportional counter has a vapor pressure at ambient temperature of less than about 50 mm. Hg and the proportional counter includes means to heat the gas-filling to a temperature at which the vapor pressure thereof is between 50 mm. Hg and atmospheric pressure.

10. Apparatus as claimed in claim 9 in which the gas-filling is a metal-organic compound.

References Cited in the file of this patent

UNITED STATES PATENTS

| | | |
|---|---|---|
| 2,409,498 | Keston | Oct. 15, 1946 |
| 2,433,554 | Herzog | Dec. 30, 1947 |
| 2,449,066 | Friedman | Sept. 14, 1948 |
| 2,602,142 | Meloy | July 1, 1952 |
| 2,612,615 | Fehr et al. | Sept. 30, 1952 |
| 2,619,600 | Hamacher | Nov. 25, 1952 |
| 2,741,708 | Armistead | Apr. 10, 1956 |
| 2,789,242 | Friedman et al. | Apr. 16, 1957 |